(12) United States Patent
Lee et al.

(10) Patent No.: US 11,781,706 B2
(45) Date of Patent: Oct. 10, 2023

(54) SUPPORTING DEVICE

(71) Applicant: SYNCMOLD ENTERPRISE CORP., New Taipei (TW)

(72) Inventors: Yi-Xin Lee, New Taipei (TW); Chuan-Min Chung, New Taipei (TW); Wen-Chen Liu, New Taipei (TW)

(73) Assignee: SYNCMOLD ENTERPRISE CORP., New Taipei (TW)

(*) Notice: Subject to any disclaimer, the term of this patent is extended or adjusted under 35 U.S.C. 154(b) by 156 days.

(21) Appl. No.: 17/363,623

(22) Filed: Jun. 30, 2021

(65) Prior Publication Data

US 2022/0049812 A1 Feb. 17, 2022

Related U.S. Application Data

(60) Provisional application No. 63/064,729, filed on Aug. 12, 2020.

(30) Foreign Application Priority Data

Mar. 7, 2021 (TW) .................................. 110202412

(51) Int. Cl.
*F16M 11/18* (2006.01)
*F16M 11/20* (2006.01)
(Continued)

(52) U.S. Cl.
CPC ........... *F16M 11/18* (2013.01); *F16M 11/046* (2013.01); *F16M 11/125* (2013.01);
(Continued)

(58) Field of Classification Search
CPC .. F16M 11/18; F16M 2200/08; F16M 11/046; F16M 11/125; F16M 11/2014; F16M 11/24; F16M 2200/024
See application file for complete search history.

(56) References Cited

U.S. PATENT DOCUMENTS

2007/0007401 A1* 1/2007 Corporation ........... F16M 11/08 248/125.7
2008/0105070 A1* 5/2008 Sawai .................... F16M 11/10 74/473.1

(Continued)

FOREIGN PATENT DOCUMENTS

CN 100427820 C * 10/2008 ............. F16M 11/08
EP 1662194 A1 * 5/2006 ............. F16M 11/08
EP 1912014 A2 * 4/2008 ............. F16D 7/021

*Primary Examiner* — Tan Le (74) *Attorney, Agent, or Firm* — Muncy, Geissler, Olds & Lowe, P.C.

(57) ABSTRACT

A supporting device is provided. The supporting device is set on a working surface for bearing a display. The supporting device comprises a base and an upright, wherein the base includes a stationary housing, a rotating element, a first gear, a second gear, a driving module, and a controlling module. The stationary housing is disposed on the working surface; the rotating element is rotatably disposed on the stationary housing and co-defines an accommodating space with the stationary housing. The first gear is disposed in the accommodating space; the second gear is also disposed in the accommodating space and is engaged to the first gear. The driving module is connected to the second gear for driving the second gear; the controlling module is electrically connected to the driving module. The upright moves together with the rotating element, the second gear, and the driving module in a circumferential direction with respect to the first gear while the driving module is controlled by the controlling module.

15 Claims, 8 Drawing Sheets

(51) Int. Cl.
*F16M 11/24* (2006.01)
*F16M 11/04* (2006.01)
*F16M 11/12* (2006.01)

(52) U.S. Cl.
CPC ......... F16M 11/2014 (2013.01); F16M 11/24 (2013.01); *F16M 2200/024* (2013.01); *F16M 2200/08* (2013.01)

(56) References Cited

U.S. PATENT DOCUMENTS

2008/0272262 A1* 11/2008 Katsumata ............. F16M 11/18
 248/349.1
2010/0193647 A1* 8/2010 Huang ................... F16M 11/10
 248/124.1

\* cited by examiner

SUPPORTING DEVICE

CROSS REFERENCE TO RELATED APPLICATION

This application claims benefit of U.S. Provisional Application Ser. No. 63/064,729, filed on Aug. 12, 2020, and the benefit of Taiwan Patent Application Serial No. 110202412 filed on Mar. 7, 2021. The entirety of the Application is incorporated herein by reference.

BACKGROUND OF THE INVENTION

1. Field of the Invention

The present invention relates to a supporting device, particularly a supporting device comprising an electrical base.

2. Description of Related Art

Generally, the display should be fixed to a supporting device to be firmly set on walls or working surfaces. Demands of the setting modes of the display are different referring to different users, the setting environment of the display is also different. Therefore, it will be inconvenient for users to manually adjust the angle or the position of the display. The other advanced usage mode is to combine the face-tracking function with the display, that is, the display may automatically be adjusted to a proper angle and a position according to the user's position. However, manual adjustment cannot achieve this kind of function. Hence, a supporting device with an electrical base is needed for users to easily adjust the angle or the position of the display, and even to automatically adjust the angle or the position of the display while tracking the user's face.

SUMMARY OF THE INVENTION

A supporting device is disclosed for bearing a display, wherein the supporting device comprises a base and an upright. The base includes a stationary housing, a rotating element, a first gear, a second gear, a driving module, and a controlling module. The rotating module is rotatably disposed on the stationary housing and co-defines an accommodating space with the stationary housing. The first gear is disposed in the accommodating space, while the second gear is disposed in the accommodating space and engaged with the first gear. The driving module is connected to the second gear for driving the second gear. The controlling module is electrically connected to the driving module. The upright is fixed to the rotating element, wherein when the second gear is driven to rotate by the driving module, which is controlled by the controlling module, the upright moves together with the rotating element, the second gear, and the driving module in a circumferential direction with respect to the first gear.

In one embodiment, the first gear is fixed to the stationary housing; the second gear is connected to at least one of the rotating element and the upright.

In one embodiment, the first gear is an internal gear or an external gear, the second gear is an external gear.

In one embodiment, the rotating element has a central shaft hole; the stationary housing has a center hole; the base further including a step screw, wherein the step screw passes through the center hole and the central shaft hole, the rotating element rotates with respect to the stationary housing about the step screw and.

In one embodiment, the step screw has a head portion, a large-diameter segment, and a small-diameter segment, which are integrally formed, wherein the large-diameter segment passes through one of the center hole and the central shaft hole, and the small-diameter segment extends into the other one of the center hole and the central shaft hole.

In one embodiment, the base further includes a rail element disposed between the rotating element and the stationary housing.

In one embodiment, the rail element has a limiting wall and at least one limiting screw, wherein the at least one limiting screw abuts against the limiting wall, the limiting wall is formed on one of the stationary housing and the rotating element, while the at least one limiting screw is fixed to the other one of the stationary housing and the rotating element.

In one embodiment, the driving module has a main body and an output shaft, the output shaft is driven by the main body and the second gear is actuated by the output shaft to rotate.

In one embodiment, the supporting device further comprises at least one sensor, wherein the at least one sensor is disposed in the accommodating space and is electrically connected to the controlling module, the base further includes an elongated element, the elongated element extends from the rotating element into the accommodating space, when the elongated element rotates along with the rotating element and detected by the sensor, the at least one sensor transmit at least one sensing signal to the controlling module, the controlling module controls the driving module to stop the rotation of the output shaft according to the at least one sensing signal.

In one embodiment, the base further includes a ring plate and at least one locking screw, the ring plate is fixed to the stationary housing, the at least one locking screw passes through and fixes the ring plate and the first gear onto the stationary housing.

In one embodiment, the ring plate has a ring slot and at least one stopping part located at the ring slot, the rotating element further has a through-hole, the base further has at least one stopping screw, wherein the at least one stopping screw passes through the through-hole and extends to the ring slot. When the rotating element rotates with respect to the stationary housing until the stopping screw contacts the at least one stopping part, the upright is in a limited position with respect to the stationary housing.

In one embodiment, the base further includes at least one wire for connecting the controlling module and the driving module, the rotating element has a penetrating hole for the at least one wire to pass thereby.

In one embodiment, the base further includes a power module electrically connected to the controlling module and the driving module.

In one embodiment, the stationary housing has a bottom plate, a groove, and a power accommodating space, the groove and the power accommodating space are formed on the bottom plate and interconnected, and the power module is accommodated in the power accommodating space.

In one embodiment, the controlling module has a control circuit board and a controller, the control circuit board is disposed in the accommodating space, the controller transmits a controlling signal to the control circuit board.

In one embodiment, the driving module is a DC gear motor.

The supporting device disclosed by the present invention utilizes the gear motor and sensors to adjust the position and angle of the display. When the control signal is transmitted to the control circuit board disposed on the upright, the driving module controlled by the control circuit board rotates the base for adjusting its angle.

DETAILED DESCRIPTION OF THE PREFERRED EMBODIMENT

Figure 1:
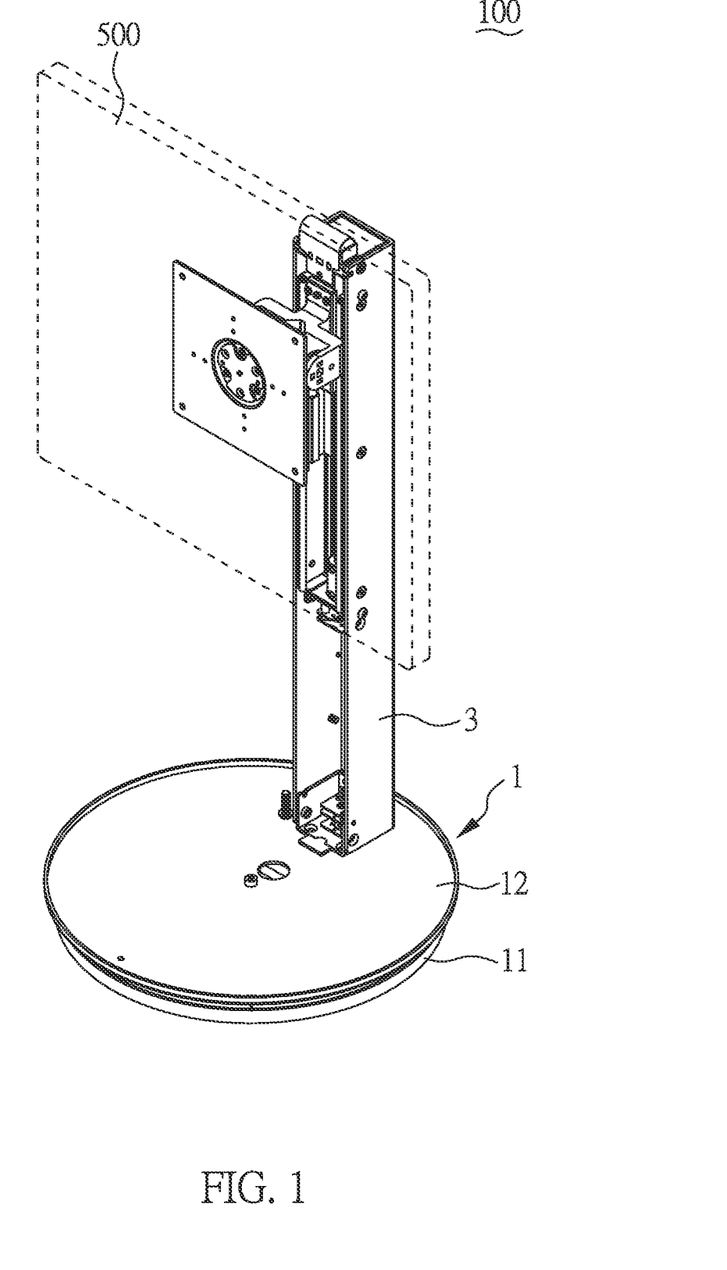
FIG. 1 is a perspective view showing the supporting device bearing a display of one embodiment of the present invention.
Figure 2:
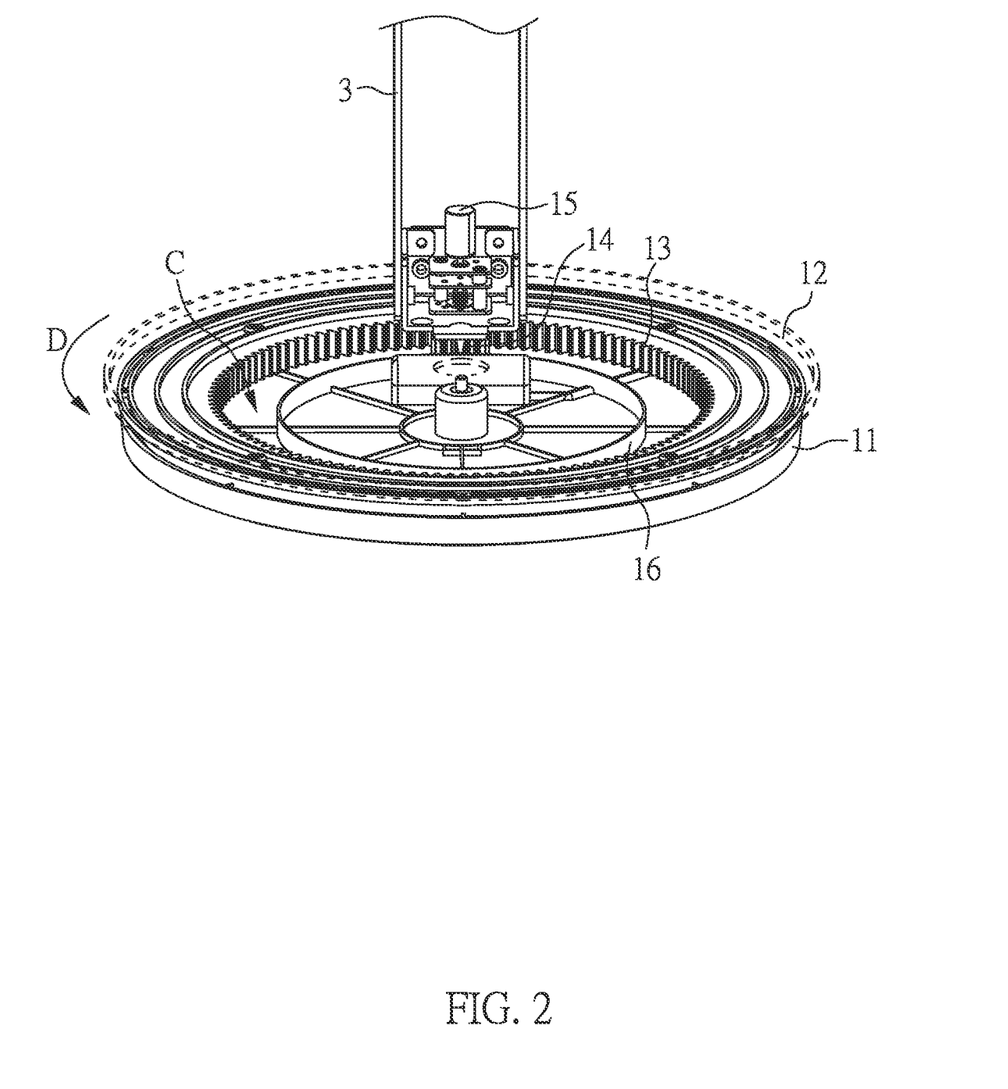
FIG. 2 is a perspective schematic view showing the base of one embodiment of the present invention.

Please refer to FIG. 1 and FIG. 2, wherein FIG. 1 illustrates a supporting device 100 bearing a display 500 and FIG. 2 shows the perspective view of a base 1 of one embodiment of the present invention. As illustrated in FIG. 1 and FIG. 2, the supporting device 100 is disposed on a working surface for bearing the display 500. The supporting device 100 comprises the base 1 and an upright 3. The base 1 includes a stationary housing 11, a rotating element 12, a first gear 13, a second gear 14, a driving module 15, a rail element 16, controlling module 21, and power module 25 (refer to FIG. 5), wherein the rotating element 12 is fixed to the upright 3.

The stationary housing 11 is disposed on the working surface; the rotating element 12 is rotatably disposed on the stationary housing 11 and co-defines an accommodating space C with the stationary housing 11. The first gear 13 and the second gear 14 are disposed in the accommodating space C, wherein the first gear 13 and the second gear 14 are engaged with each other. The driving module 15 connects to the second gear 14 and drives the second gear 14 to rotate. The driving module 15 may be a DC (direct current) gear motor. The rail element 16 is disposed between the rotating element 12 and the stationary housing 11 so that the rotating element 12 and the stationary housing 11 may rotate with respect to each other along the rail element 16. In the present embodiment, the controlling module 21 controls the driving module 15, which drives the second gear 14 to rotate, so that the upright 3 moves together with the rotating element 12, the second gear 14, and the driving module 15 in a circumferential direction D with respect to the first gear 13.

The first gear 13 is fixed to the stationary housing 11, the second gear 14 is connected to one of the rotating element 12 and the upright 3. In the present embodiment, the first gear 13 is an internal gear 13, while the second gear 14 is an external gear. The second gear 14 is located at an inner space of the first gear 13 and is engaged with the first gear 13 so that the second gear 14 may rotate around the first gear 13. In another embodiment, both the first gear 13 and the second gear 14 may be external gears. The second gear 14 may rotate in the annular space formed between outside of the first gear 13 and the stationary housing 11 so that the upright 3 can still move together with the rotating element 12, the second gear 14, and the driving module 15 in the circumferential direction D with respect to the first gear 13.

Figure 3:
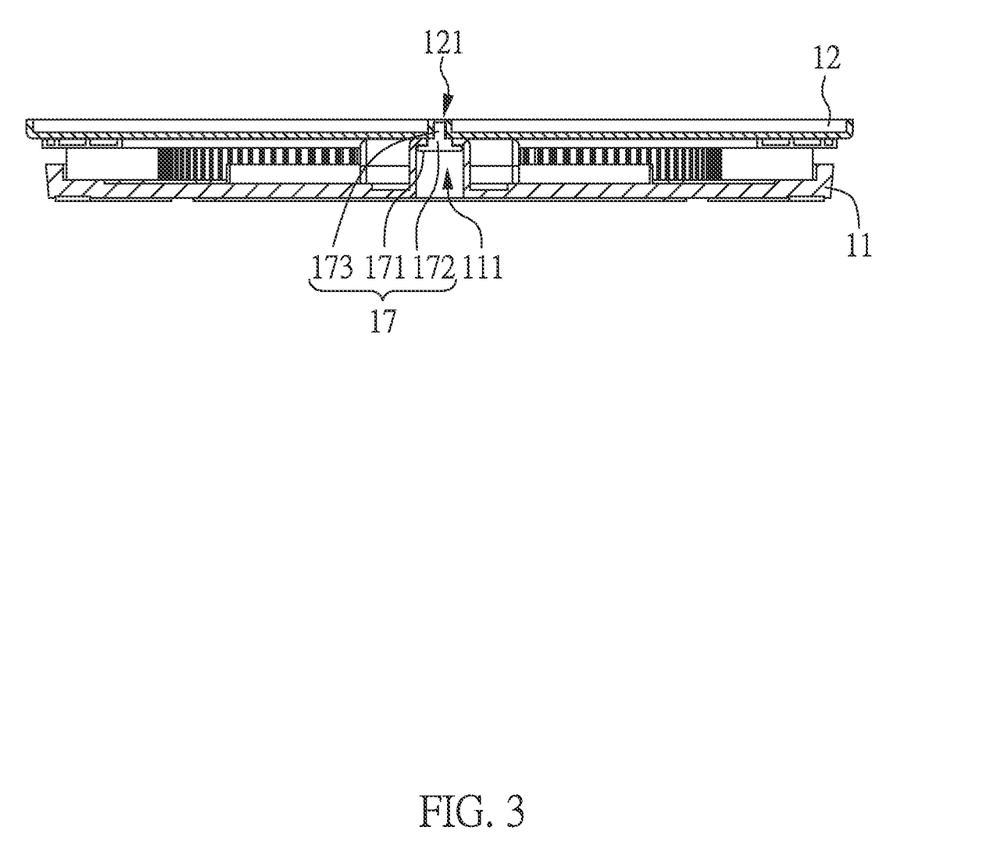
FIG. 3 is a cross-sectional view of the base of one embodiment of the present invention.

Please refer to FIG. 3, which shows the cross-sectional view of the base 1 of one embodiment of the present invention. As illustrated in FIG. 3, the stationary housing 11 has a center hole 111, and the rotating element 12 has a central shaft hole 121. The base 1 further includes a step screw 17, wherein the step screw 17 passes through the center hole 111 and the central shaft hole 121. The rotating element 12 rotates about the step screw 17 with respect to the stationary housing 11. In the present embodiment, the step screw 17 has a head portion 171, a large-diameter segment 172, and a small-diameter segment 173, which are integrally formed. The large-diameter segment 172 passes through the center hole 111, and the small-diameter segment 173 extends into the central shaft hole 121. In another embodiment, the step screw 17 can be reversely disposed so that the large-diameter segment 172 passes through the central shaft hole 121 and the small-diameter segment 173 extends into the center hole 111.

Figure 4:
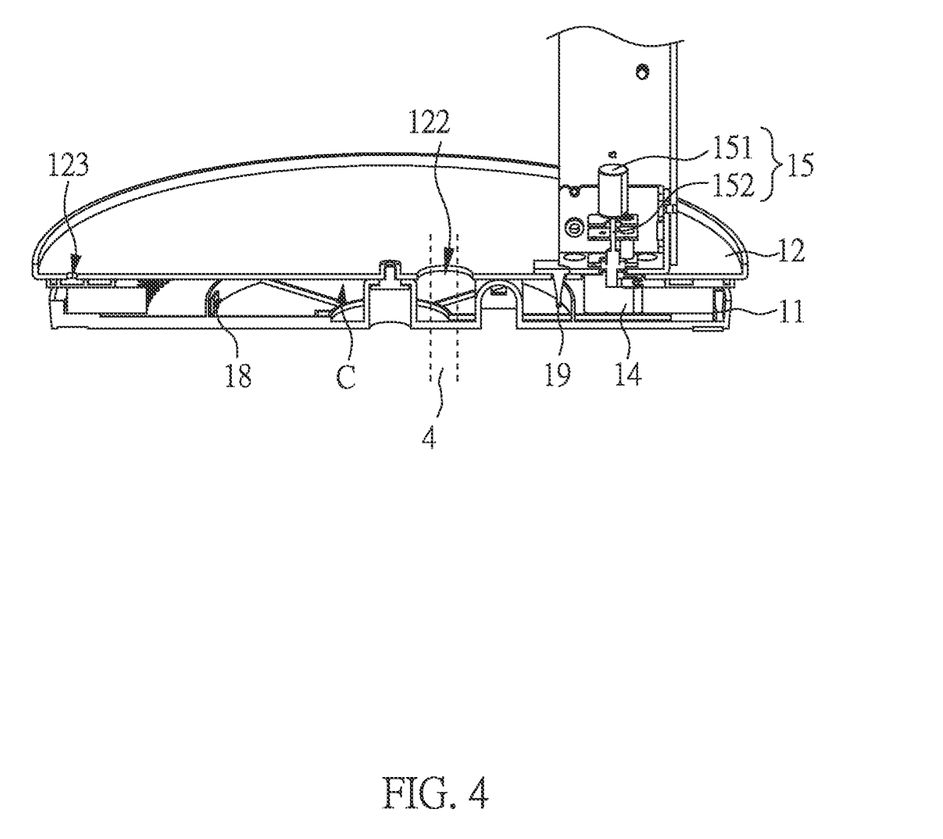
FIG. 4 is a cross-sectional view of another angle of the base of one embodiment of the present invention.
Figure 5:
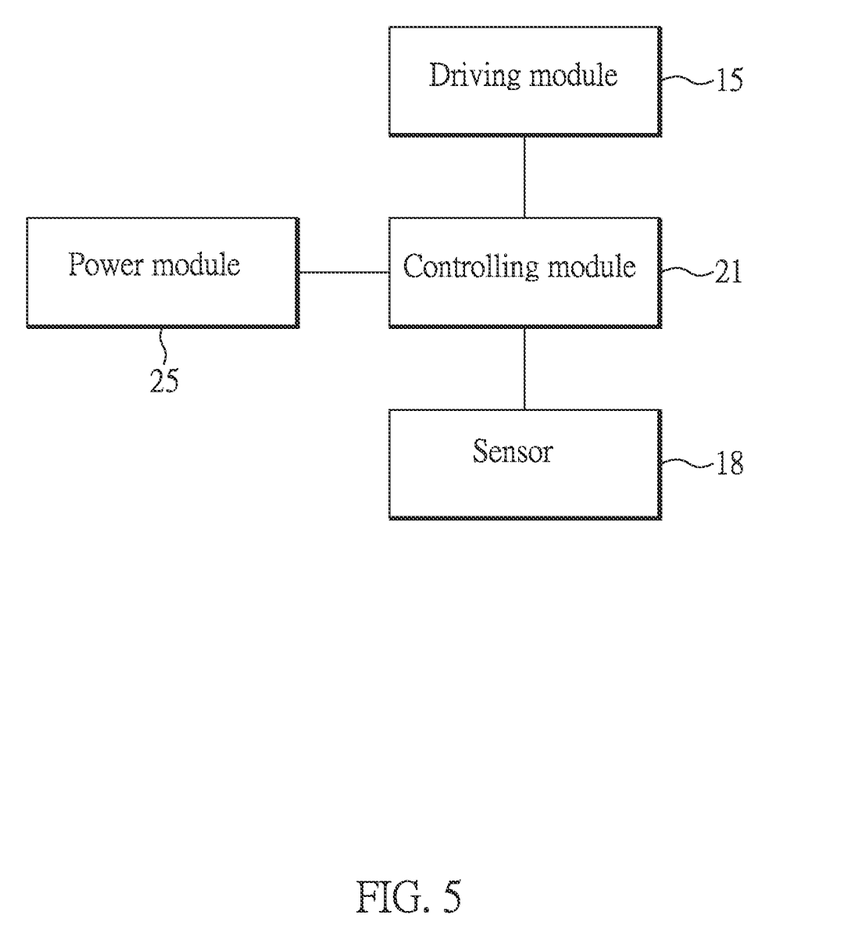
FIG. 5 is a schematic diagram showing the connection of the electrical elements of the supporting device of one embodiment of the present invention.

Please refer to FIG. 4 and FIG. 5, wherein FIG. 4 illustrates the cross-sectional view of another angle of the base 1, FIG. 5 illustrates the schematic diagram showing the connection of the electrical elements of the supporting device 100. As illustrated in FIG. 4, the driving module 15 includes a main body 151 and an output shaft 152. The output shaft 152 is driven to rotate by the main body 151, while the second gear 14 is actuated by the output shaft 152 to rotate. The base 1 includes at least one sensor 18 and an elongated element 19, wherein the sensor 18 is disposed in the accommodating space C and the elongated element 19 extends from the rotating element 12 into the accommodating space C. The elongated element 19 rotates together with the rotating part 12, and the sensor 18 will be triggered when the elongated element 19 rotates and detected by the sensor 18.

As illustrated in FIG. 5, the controlling module 21 is electrically connected to the driving module 15 and the sensor 18, the power module is electrically connected to the controlling module 21 for providing the power to the controlling module 21. When the sensor 18 is triggered by the elongated element 19, which rotates together with the rotating element 12, the sensor 18 correspondingly transmits a sensing signal to the controlling module 21. The controlling module 21 then controls the driving module 15 to stop the output shaft 152 from rotating based on the sensing signal. It should be noted that the rotating element 12 has a through-hole 122 for the wires 4 connecting the controlling module 21 and the driving module 15 to pass thereby. Preferably, the through-hole 122 is located near the center of the rotating element 12 to prevent dragging the wires during the rotating process. The controlling module 21 may be a control circuit board and a controller, the controlling circuit board is disposed in the accommodating space C while the controller is operated by users to transmit the controlling signals to the controlling circuit board.

The sensor 18 illustrated in FIG. 4 is located at the opposite side of the elongated element 19; therefore, when the elongated element 19 rotates clockwise or counterclockwise about 180°, the sensor 18 will be triggered to stop the driving module 15 from rotating. It should be noted that more than one sensor 18 may be disposed to limit the rotation angle of the rotating element 12, the present invention is not limited thereto.

Figure 6:
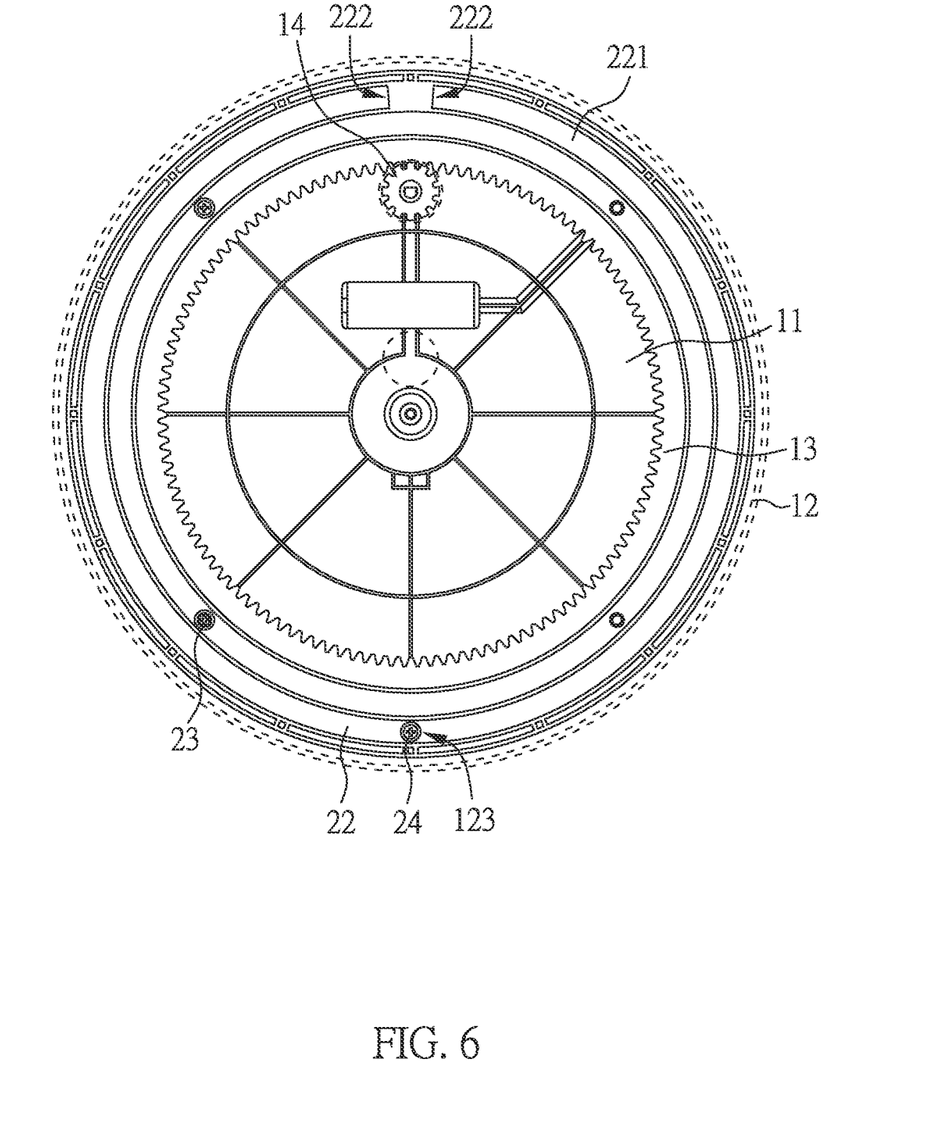
FIG. 6 is a top view of the base of one embodiment of the present invention.

Please refer to FIG. 6, which shows the top view of the base 1 of one embodiment of the present invention. As illustrated in FIG. 6, the base 1 further includes a ring plate 22 and at least one locking screw 23. The ring plate 22 is fixed to the stationary housing 11, the locking screw 23 penetrates through the ring plate 22 and the first gear 13 for fixing the ring plate 22 and the first gear 13 onto the stationary housing 11. The ring plate 22 has a ring slot 221 and at least one stopping part 222 located at the ring slot 221. The rotating element 12 further has a penetrating hole 123, the base further includes at least one stopping screw 24, wherein the at least one stopping screw 24 passes through the penetrating hole 123 and extends into the ring slot 221. When the rotating element 12 rotates with respect to the stationary housing 11 until the stopping screw contacts with the at least one stopping part 222, the upright 3 is in a limited position with respect to the stationary housing 11. In other words, when the stopping screw 24 rotates clockwise or counterclockwise about 180°, the stopping screw 24 will abut against the stopping part 222 so that the upright 3 is in the limited position (even though the driving module 15 keeps on rotating).

Figure 7:
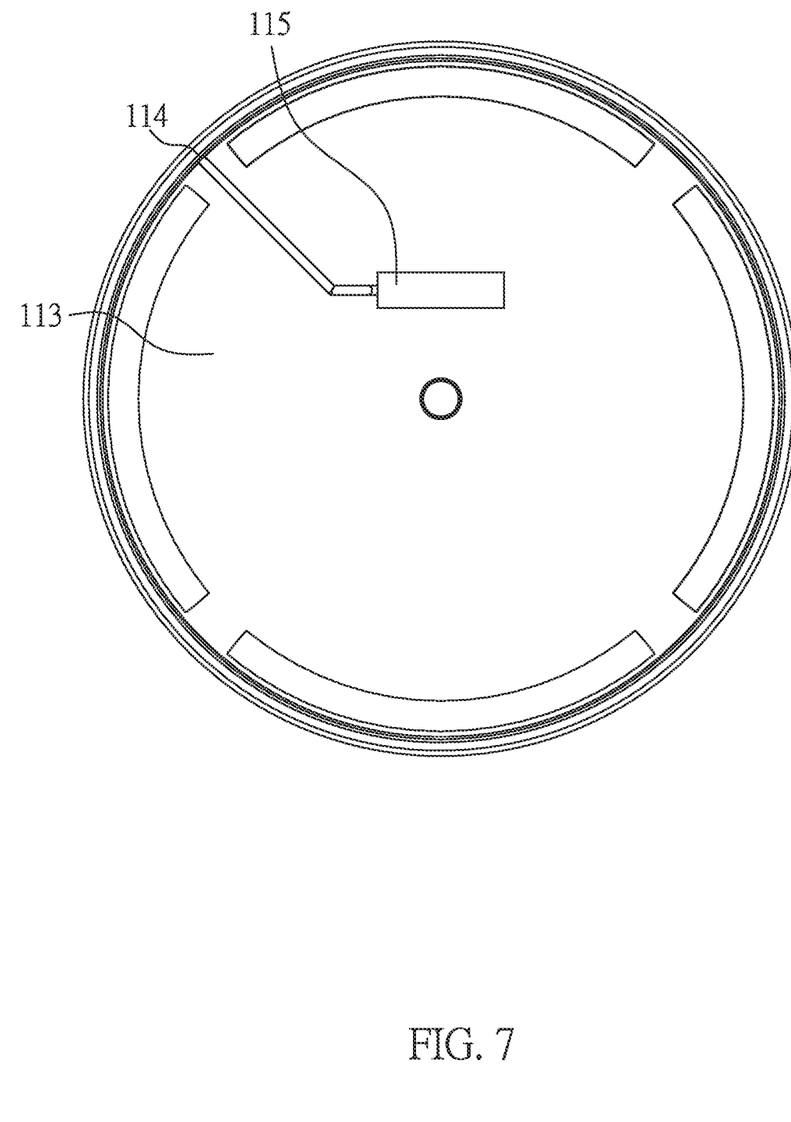
FIG. 7 is a bottom view of the base of one embodiment of the present invention.

Please refer to FIG. 7, which illustrates the bottom view of the base 1 of one embodiment of the present invention. As illustrated in FIG. 7, the stationary housing 11 has a bottom plate 113, a groove 114, and a power accommodating space 115. The groove 114 and the power accommodating space 115 are formed on the bottom plate 113 and are interconnected with each other, wherein the power module 25 is accommodated in the power accommodating space 115 and the wires pass through the groove 114.

Figure 8:
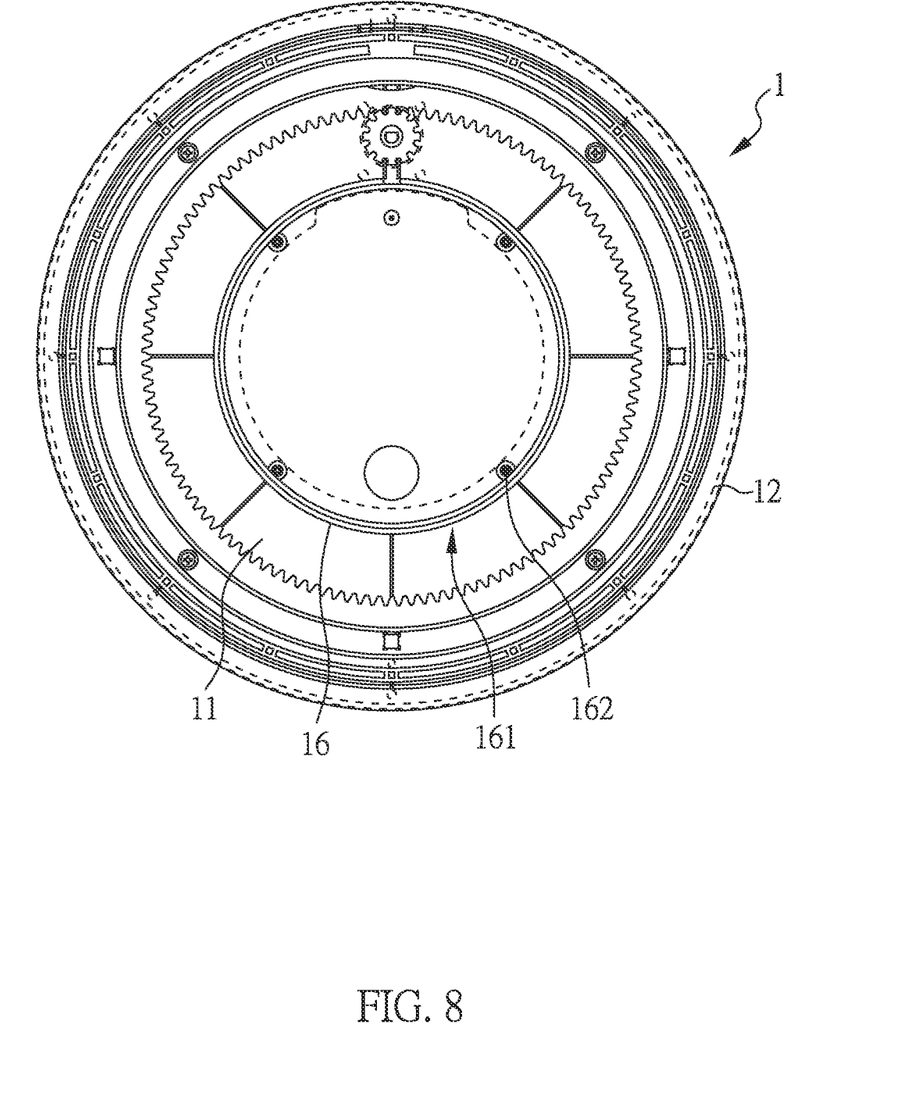
FIG. 8 is a top view of the base of another embodiment of the present invention.

Please refer to FIG. 8, which illustrates the bottom view of another embodiment of the present invention. As illustrated in FIG. 8, the base 1 includes a rail element 16 disposed between the rotating element 12 and the stationary housing 11. The rail element 16 has a limiting wall 161 and at least one limiting screw 162 (the number of the limiting screw demonstrated in this present embodiment is four), wherein the limiting screws 162 abut against the limiting wall 161. The limiting wall 161 may be formed on the stationary housing 11 while the limiting screws 162 are screwed to the rotating element 12. In this way, when the rotating element 12 rotates along with the driving module 15, the rotating element 12 and the stationary housing 11 may rotate with respect to each other along the rail element 16 through the coordination of the limiting screws 162 and the limiting wall 161. Similarly, the limiting wall 161 may be formed on the rotating element 12, while the limiting screws 162 are screwed to the stationary housing 12; the invention is not limited thereto.

In summary, the supporting device of the present invention comprises an electrical base, which mainly includes electrical elements such as motors and sensors. The rotating angle of the display may be adjusted when the controlling signal is transmitted to the controlling circuit board disposed on the supporting device, for example, the users operate the remote control or the supporting device actively operates to send out the controlling signal; therefore, the controlling circuit board controls the driving module, which drives the bottom plate to rotate, for adjusting the angle of the bottom plate.

What is claimed is:

1. A supporting device for bearing a display, comprising:
 a base including:
  a stationary housing;
  a rotating element rotatably disposed on the stationary housing and co-defining an accommodating space with the stationary housing;
  a first gear disposed in the accommodating space;
  a second gear disposed in the accommodating space and engaged with the first gear;
  a driving module connected to the second gear for driving the second gear;
  a controlling module electrically connected to the driving module;
  a ring plate fixed to the stationary housing; and
  at least one locking screw penetrating through and fixing the ring plate and the first gear onto the stationary housing; and
 an upright fixed to the rotating element;
 wherein when the second gear is driven to rotate by the driving module, which is controlled by the controlling module, the upright moves together with the rotating element, the second gear, and the driving module in a circumferential direction with respect to the first gear.

2. The supporting device as claimed in claim 1, wherein the first gear is fixed to the stationary housing, and the second gear is connected to at least one of the rotating element and the upright.

3. The supporting device as claimed in claim 2, wherein the first gear is an internal gear or an external gear, and the second gear is an external gear.

4. The supporting device as claimed in claim 3, wherein the rotating element has a central shaft hole, the stationary housing has a center hole, and the base further includes a step screw, wherein the step screw passes through the center hole and the central shaft hole, and the rotating element rotates with respect to the stationary housing about the step screw.

5. The supporting device as claimed in claim 4, wherein the step screw has a head portion, a large-diameter segment, and a small-diameter segment, which are integrally formed, wherein the large-diameter segment passes through one of the center hole and the central shaft hole, and the small-diameter segment extends into the other one of the center hole and the central shaft hole.

6. The supporting device as claimed in claim 3, wherein the base further includes a rail element disposed between the rotating element and the stationary housing.

7. The supporting device as claimed in claim 6, wherein the rail element has a limiting wall and at least one limiting screw abutting against the limiting wall, wherein the limiting wall is formed on one of the stationary housing and the rotating element, while the at least one limiting screw is fixed to the other one of the stationary housing and the rotating element.

8. The supporting device as claimed in claim 1, wherein the driving module has a main body and an output shaft, the output shaft is driven by the main body and the second gear is actuated by the output shaft to rotate.

9. The supporting device as claimed in claim 8, further comprises at least one sensor disposed in the accommodating space and electrically connected to the controlling module, wherein the base further includes an elongated element, the elongated element extends from the rotating element into the accommodating space, when the elongated element rotates along with the rotating element and detected by the sensor, the at least one sensor transmits at least one sensing signal to the controlling module, the controlling module controls the driving module to stop the rotation of the output shaft according to the at least one sensing signal.

10. The supporting device as claimed in claim 9, wherein the ring plate has a ring slot and at least one stopping part located at the ring slot, the rotating element further has a through-hole, the base further includes at least one stopping screw, wherein the at least one stopping screw passes through the through-hole and extends to the ring slot, when the rotating element rotates with respect to the stationary housing until the stopping screw contacts with the at least one stopping part, the upright is in a limited position with respect to the stationary housing.

11. The supporting device as claimed in claim 10, wherein the base further includes at least one wire for connecting the controlling module and the driving module, the rotating element has a penetrating hole for the at least one wire to pass thereby.

12. The supporting device as claimed in claim 11, wherein the base further includes a power module electrically connected to the controlling module and the driving module.

13. The supporting device as claimed in claim 12, wherein the stationary housing has a bottom plate, a groove, and a power accommodating space, the groove and the power accommodating space are formed on the bottom plate and interconnected, the power module is accommodated in the power accommodating space.

14. The supporting device as claimed in claim 13, wherein the controlling module has a control circuit board and a controller, the control circuit board is disposed in the accommodating space, the controller transmits a controlling signal to the control circuit board.

15. The supporting device as claimed in claim 14, wherein the driving module is a DC gear motor.

\* \* \* \* \*